United States Patent [19]
Messenger

[11] 3,843,139
[45] Oct. 22, 1974

[54] OIL SEAL
[75] Inventor: Edward J. Messenger, Longview, Tex.
[73] Assignee: Garlock Inc., Palmyra, N.Y.
[22] Filed: July 24, 1972
[21] Appl. No.: 274,161

Related U.S. Application Data
[63] Continuation-in-part of Ser. No. 100,924, Dec. 23, 1970, abandoned.

[52] U.S. Cl................ 277/37, 277/183, 308/187.1,
[51] Int. Cl. .......................... F16c 33/76, F16j 15/32
[58] Field of Search........................ 277/37, 38, 183

[56] References Cited
UNITED STATES PATENTS
| | | | |
|---|---|---|---|
| 2,834,616 | 5/1958 | Gebert et al. | 277/37 |
| 3,306,683 | 2/1967 | Deuring | 277/37 X |
| 3,356,376 | 12/1967 | Bradfute et al. | 277/37 |
| 3,396,975 | 8/1968 | Otto | 277/38 X |
| 3,531,168 | 9/1970 | Bainard | 277/37 X |
| 3,614,183 | 10/1971 | Berens | 277/37 |

Primary Examiner—Samuel B. Rothberg
Attorney, Agent, or Firm—Schovee & Boston

[57] ABSTRACT

An oil seal for use in an axle housing bore and including an inner sealing element for sealing the rotating axle and an outer seal providing a seal between the O.D. of the oil seal and the axle housing bore. The oil seal includes, in a first embodiment, a relatively rigid inner shell to which the sealing element is bonded, an outer shell that is a slip fit over the inner shell, and a separate ring type O.D. gasket positioned between said shells. In a second embodiment, the outer seal is bonded to the inner shell. The oil seal provides a slip fit into the bore of the axle housing and the O.D. gasket expands radially outwardly to effect the O.D. seal, when the clamping plate axially tightens the outer shell onto the inner shell. In both embodiments, the O.D. of the outer seal preferably includes an annular groove to take up any excess elastomer during its expansion.

4 Claims, 3 Drawing Figures

PATENTED OCT 22 1974

INVENTOR.
EDWARD J. MESSENGER

BY Schovee + Boston

ATTORNEYS

OIL SEAL

CROSS-REFERENCE TO RELATED APPLICATION

This application is a continuation-in-part of my copending application Ser. No. 100,924, filed Dec. 23, 1970, and now abandoned.

BACKGROUND OF THE INVENTION

1. Field of the Invention

This invention relates to oil seals and in particular to an improved expandable O.D. oil seal.

2. Description of the Prior Art

Expandable O.D. oil seals are known, however, known oil seals for axle housing bores that incorporate an expandable O.D. seal are subject to various inherent disadvantages that are overcome by the present invention. For example, in known seals the O.D. seal is bonded to the less rigid outer shell. The less rigid outer shell is more susceptible to distortion during assembly and clamping than is the more rigid inner shell, and if the less rigid shell is damaged and rendered unfit for use, then the O.D. seal and the sealing element also must be discarded since they are bonded thereto. The two shells must be handled carefully during assembly or else they can come apart; this complicates assembly.

It is an object of the present invention to provide an improved oil seal that is not subject to the above disadvantages.

BRIEF DESCRIPTION OF THE DRAWINGS

The present invention will be more fully understood by reference to the following detailed description thereof, when read in conjunction with the attached drawing, wherein like reference numerals refer to like elements, and wherein.

DETAILED DESCRIPTION OF THE PREFERRED EMBODIMENTS

Figure 1:
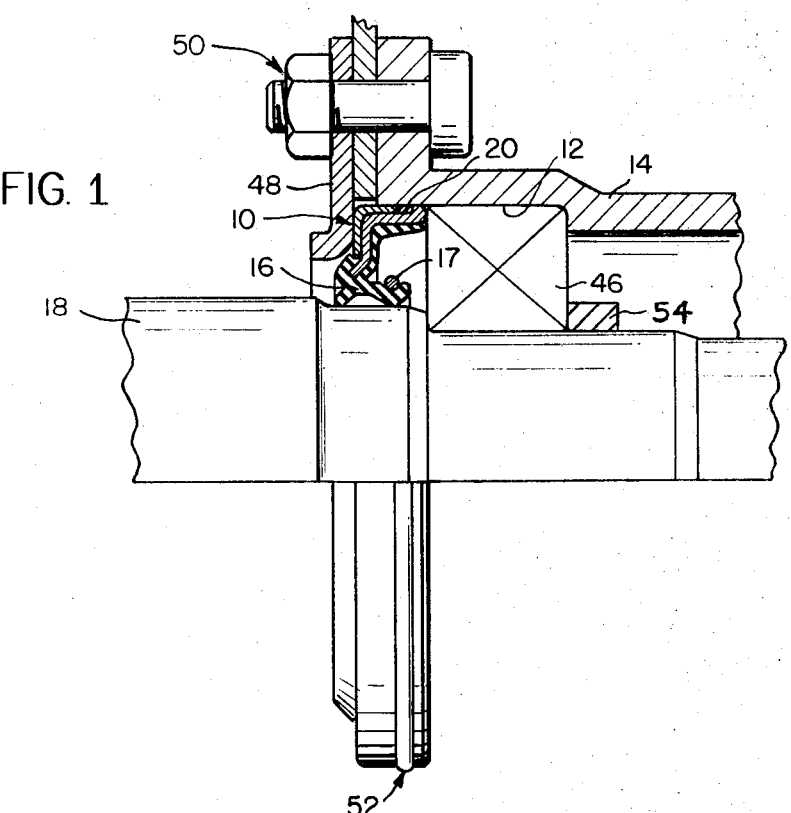
FIG. 1 is a partial cross-sectional view of the oil seal of a first embodiment of the present invention shown installed in an axle housing bore.

Referring now to the drawing, FIG. 1 shows a first embodiment of an oil seal 10 constructed according to the present invention and installed in a bore 12 of an axle housing 14. The oil seal 10 includes a sealing element 16, and associated garter spring 17, for sealing a rotatable axle 18 passing through the housing 14, and also includes an O.D. gasket 20 for providing a seal between the O.D. of the oil seal 10 and the bore 12.

The oil seal 10 will now be described in detail with reference to FIG. 2. The oil seal 10 comprises a relatively rigid, inner annular shell 22 to which the sealing element 16 is bonded, a less rigid, outer annular shell 24, and the O.D. gasket 20. The shells 22 and 24 are preferably metal stampings, but other materials and methods of forming the shell can be used. The inner shell 22 has a cylindrical section 26, a relatively small, radially outwardly extending flange 28 adjacent the inside end of the shell 22 and a larger, radially inwardly extending flange 30 adjacent the outside end of the shell 22 (the term "inside end" means the end that extends further into the housing 14, and vice versa for the term "outside end"). The sealing element 16 is bonded to the shell 22, and the flange 30 provides reinforcement for the sealing element 16. An outer cylindrical surface 32 of the flange 28 is a slip fit in the bore 12 of the housing 14.

The O.D. gasket 20 is a separate, lathe cut, ring gasket and it is slightly stretched over the cylindrical section 26 and has an O.D. that is less than the I.D. of the bore 12, and is equal to or less than the O.D. of surface 32, to facilitate insertion of the oil seal 10 into the bore 12 without damage occurring to the O.D. gasket 20. The O.D. gasket 20 is formed of a material, preferably synthetic rubber, such that when the gasket 20 is compressed axially between the inner shell 22 and the outer shell 24, it will expand radially outwardly to effect a seal with the bore 12.

The outer shell 24 is a slip fit within the bore 12 and over the cylindrical section 26 of the inner shell 22. The outer shell 24 comprises a cylindrical section 34 and a radial section 36. The parts of the oil seal 10 are dimensioned such that when the oil seal 10 is completely installed, as shown in FIG. 1, an inside surface 38 of the section 36 of the outer shell 24, contacts an outside surface 40 of the flange 30. In this position, the O.D. gasket 20 will have been axially compressed and will have been radially expanded a predetermined amount sufficient to effect the desired O.D. seal.

An additional feature of the present invention comprises means for lossely retaining the two shells 22 and 24 together to aid in assembly. This retaining structure comprises an annular bead 42 formed on the sealing element 16 and having an O.D. greater than the inside diameter of an inner edge 44 of the radial section 36 of the outer shell 24, as shown in FIG. 2. In this way, the outer shell 24 can be manually slid onto the inner shell 22 until the inner edge 44 of the section 36 snaps past the bead 42. The two shells 22 and 24 do not thereafter have to be manually held together; the oil seal 10 can then be installed as a single unit.

One preferred application in which the oil seal 10 is used, is in an automobile rear axle design using an outboard bearing 46 clamped in position using the oil seal shell as a structural member of the assembly. The oil seal 10 is clamped in place axially by means of a clamping plate 48 and a plurality of bolt-nut assemblies 50 for tightening the clamping plate 48 against the oil seal 10. When the oil seal 10 is clamped axially, the O.D. gasket 20 is axially compressed and expands radially outwardly. The radial expansion is shown diagrammatically at 52 in FIG. 1 to indicate the expansion that would occur if the gasket 20 was compressed axially but was not positioned within the bore 12. A press fit bearing retaining ring 54 retains bearing 46 in place as is known in the art.

It is to be noted that the sealing element 16 is bonded to the rigid shell that fits into the housing bore, thus assuring concentric location of the sealing element 16 to the axle housing bore 12. During assembly, the O.D. of the gasket 20 never protrudes beyond the O.D. locating surface 32 of the inner shell 22. This ensures that the gasket 20 cannot be sheared off during insertion and assembly of the oil seal 10 in the housing bore 12; this feature eliminates any possibility of leakage problems arising that could be caused by damage to the O.D. gasket 20 during insertion and assembly. This slip fit feature of the present invention eliminates seal damage of the type occurring in the field, where oil seals having O.D. sealing beads larger in diameter than the I.D. of the housing bore, are pressed or pounded into the housing bore with often resulting damage to the protruding sealing beads.

Figure 2:
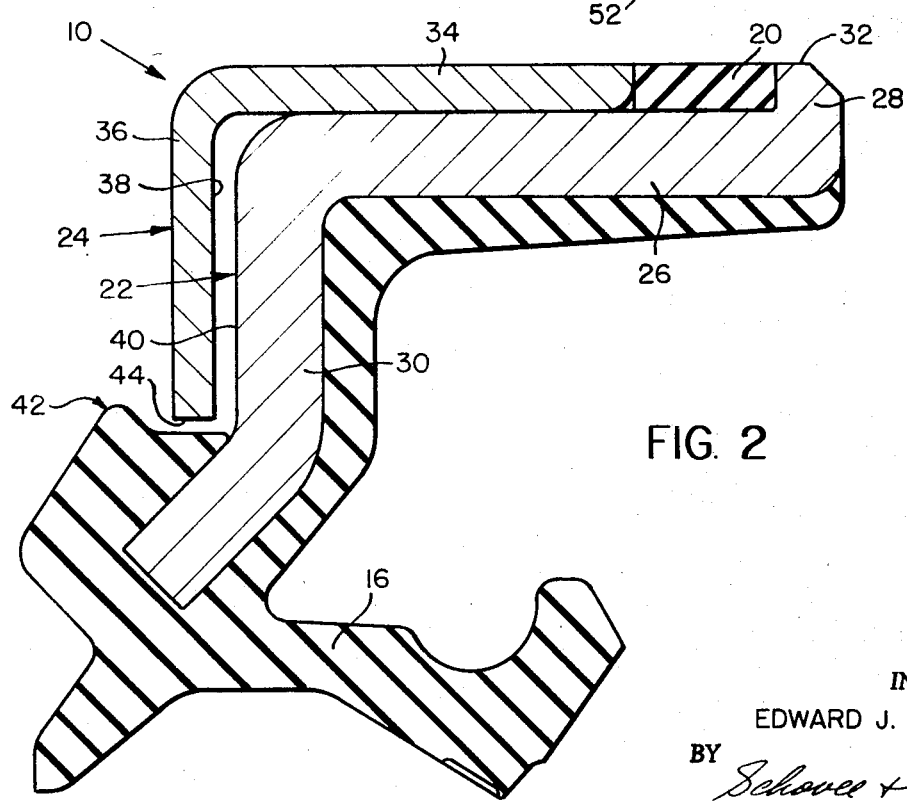
FIG. 2 is an enlarged cross-sectional view through the oil seal of FIG. 1 prior to installation.

Another advantage of this embodiment of FIGS. 1 and 2 of the present invention is that the O.D. gasket 20 can be replaced when the axle 18 is removed from within the housing 14 without having to first remove the bearing 46 and the ring 54, as is required when using known oil seals. This is done by cutting off the old gasket 20 and by stretching a new gasket 20 over the bearing 46 and into place in the oil seal 10.

Figure 3:
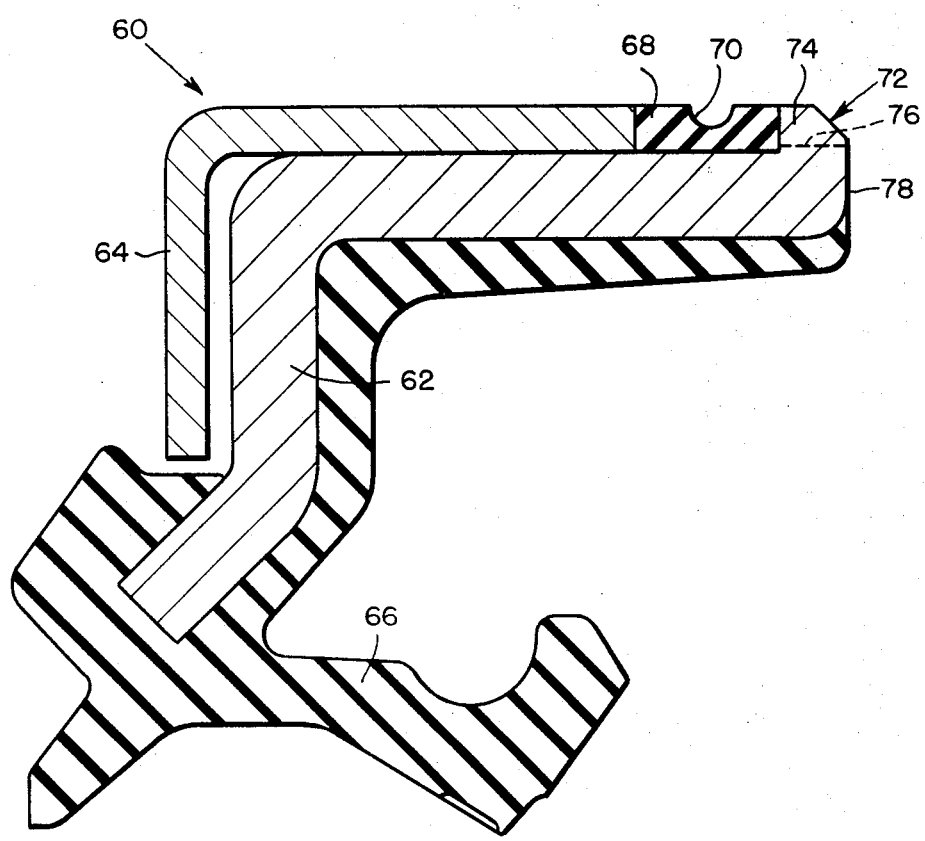
FIG. 3 is an enlarged cross-sectional view through the oil seal of a second embodiment of the present invention.

A second embodiment of the present invention will now be described with reference to FIG. 3. FIG. 3 shows an oil seal 60, similar to the oil seal 10 of FIGS. 1 and 2 and adapted to be installed in a bore 12 of an axle housing 14 as is the oil seal 10 shown in FIG. 1.

The oil seal 60 includes a relatively rigid, inner annular shell 62, a less rigid, outer annular shell 64, and a sealing element 66 and an O.D. gasket 68, both bonded to the inner shell 64. The O.D. gasket 68 includes an annular groove 70 in its O.D. surface, the purpose for which will be described below. The inner shell 62 includes a flange 72 similar to the flange 28 of FIG. 2 except that flange 72 is not continuous but rather is formed as a plurality of spaced-apart nibs 74 separated by grooves 76. The nibs are much thinner than the grooves; for example, the shell preferably employs about eight equally spaced-apart nibs, about five thirty-seconds inch wide separated by the grooves 76. The purpose of the grooves 76 in the flange 72 is that the sealing element 66 and the O.D. gasket 68 are preferably molded and bonded to the inner shell 62 at the same time, and preferably a single rubber prep is used. The groovs 76 provide a path for the rubber to flow from one side of the inner shell 62 to the other. A thin film of the material of which the seals are made may occur across an end 78 of the inner shell 62.

The annular groove 70 is an important feature of the O.D. gasket 68 in that it provides a space for the rubber to be compressed into to allow for normal tolerance variations in component parts. The groove 70 prevents over-compression of the rubber O.D. gasket 68, which over-compression could cause rubber to be forcibly extruded into undesirable areas. The groove 70 will also ensure that the two metal shells 62 and 64 will bottom out against each other, which is necessary to properly clamp the bearing.

The sealing elements of the oil seals 10 and 60 are preferably made of elastic material, such as synthetic rubber. The oil seals 10 and 60 can be used in other applications than as automobile axle seals. The annular groove 70 can be used in both of the embodiments described above.

The invention has been described in detail with particular reference to the preferred embodiments thereof, but it will be understood that variations and modifications can be effected within the spirit and scope of the invention as described hereinabove and defined in the appended claims.

I claim:

1. In a seal including a sealing element, a relatively rigid, inner annular shell including a radially outwardly extending flange, a less rigid outer annular shell that is a slip fit over the inner shell, an auxiliary O.D. resilient gasket positioned on the O.D. of the inner shell and confined thereon between said flange and said outer shell, said gasket being radially expandable when the outer shell is clamped axially onto the inner shell, the improvements wherein the sealing element is bonded to the relatively more rigid inner shell, wherein the O.D. gasket and the sealing element are both bonded to said inner shell, and wherein said outwardly turned flange comprises a plurality of spaced-apart nibs with grooves therebetween.

2. The apparatus according to claim 1 including a thin layer of elastomer connecting said O.D. gasket and said sealing element and extending through said grooves in said flange.

3. An oil seal for use in an automotive axle housing of the type wherein a clamping plate applies an axial load to the seal to clamp a bearing in place, said seal comprising;

a. a relatively rigid, annular, inner shell having and O.D. smaller than the I.D. of said housing and having an outwardly turned flange the O.D. of which is a slip fit within the I.D. of the axle housing, a sealing element bonded to the inner shell and extending radially inwardly for contacting an axle positioned in said housing;

b. an auxiliary O.D. resilient gasket positioned on the O.D. of said inner shell and having an O.D. not larger than the I.D. of said housing and not larger than the O.D. of said outwardly turned flange; and c. a less rigid, annular, outer shell having an O.D. which is a slip fit within the I.D. of said housing and having an I.D. which is a slip fit on the O.D. of said inner shell, whereby when said outer shell is clamped axially onto the inner shell, the auxiliary O.D. gasket is forced to expand radially outwardly into sealing contact with the I.D. of said housing; and wherein the O.D. gasket and the sealing element are both bonded to said inner shell, and wherein said outwardly turned flange comprises a plurality of spaced-apart nibs with grooves therebetween.

4. The apparatus according to claim 3 including a thin layer of elastomer connecting said O.D. gasket and said sealing element and extending through said grooves in said flange.

* * * * *